(12) United States Patent
Economy et al.

(10) Patent No.: US 7,580,859 B2
(45) Date of Patent: Aug. 25, 2009

(54) INTELLIGENT TRANSACTION ROUTER AND PROCESS FOR HANDLING MULTI-PRODUCT POINT OF SALE TRANSACTIONS

(75) Inventors: Theodore F. Economy, Weehawken, NJ (US); Gregory R. Sturm, Chatham Township, NJ (US); Leslie A. Uzar, Blairstown, NJ (US)

(73) Assignee: Coinstar E-Payment Services Inc., Bellevue, WA (US)

( * ) Notice: Subject to any disclaimer, the term of this patent is extended or adjusted under 35 U.S.C. 154(b) by 729 days.

(21) Appl. No.: 10/923,976

(22) Filed: Aug. 23, 2004

(65) Prior Publication Data

US 2005/0080678 A1 Apr. 14, 2005

Related U.S. Application Data

(60) Provisional application No. 60/497,454, filed on Aug. 22, 2003.

(51) Int. Cl.
G06Q 20/00 (2006.01)
H04L 9/32 (2006.01)
G07F 7/08 (2006.01)

(52) U.S. Cl. ............................. 705/16; 380/25; 380/23; 380/24; 380/49

(58) Field of Classification Search .................. 705/16, 705/17, 21, 14; 235/375, 380, 381, 383
See application file for complete search history.

(56) References Cited

U.S. PATENT DOCUMENTS

| 5,309,506 A | 5/1994 | Alexander |
| 5,511,114 A | 4/1996 | Stimson et al. |
| 5,578,808 A | 11/1996 | Taylor |
| 5,696,908 A | 12/1997 | Muehlberger et al. |

(Continued)

FOREIGN PATENT DOCUMENTS

WO WO9858345 * 12/1998

OTHER PUBLICATIONS

PCT International Search Report for International Application No. PCT/US04/27235, date of mailing May 20, 2005, 3 pages.

*Primary Examiner*—Matthew S Gart
*Assistant Examiner*—Garcia Ade
(74) *Attorney, Agent, or Firm*—Perkins Coie LLP (57) ABSTRACT

A transaction router and corresponding process that enables the point-of-sale activation (POSA) of POSA type devices, such as POSA pre-paid gift cards, debit cards, telephone cards and cellular replenishment cards, while utilizing a standard credit card swipe terminal (reader). The transaction router, during use, receives the output of the reader and allows standard credit and debit card transactions to pass to the financial transaction processing entity that is called by the reader, to allow the financial transaction to be carried out. If the card or device being read by the reader is a POSA type device to be activated, then the router routes the communication initiated by the reader to another processing entity capable of activating the POSA device. The reader is unaware of the existence of the router and operates in its ordinary manner, whether standard credit and debit cards are being processed, or whether a POSA card or other POSA device is being activated. Increasing the value of a previously activated POSA card also may be carried out.

28 Claims, 2 Drawing Sheets

U.S. PATENT DOCUMENTS

| | | | |
|---|---|---|---|
| 5,721,768 | A | 2/1998 | Stimson et al. |
| 5,777,305 | A | 7/1998 | Smith et al. |
| 5,918,909 | A | 7/1999 | Fiala et al. |
| 5,991,413 | A * | 11/1999 | Arditti et al. ............... 705/77 |
| 5,999,624 | A | 12/1999 | Hopkins |
| 6,000,608 | A | 12/1999 | Dorf |
| 6,032,859 | A | 3/2000 | Muehlberger et al. |
| 6,070,147 | A | 5/2000 | Harms et al. |
| 6,129,275 | A | 10/2000 | Urquhart et al. |
| 6,129,276 | A | 10/2000 | Jelen et al. |
| 6,189,787 | B1 | 2/2001 | Dorf |
| 6,256,690 | B1 | 7/2001 | Carper |
| 6,311,165 | B1 | 10/2001 | Coutts et al. |
| 6,405,182 | B1 | 6/2002 | Cuervo |
| 6,502,745 | B1 | 1/2003 | Stimson et al. |
| 6,575,361 | B1 | 6/2003 | Graves et al. |
| 6,651,885 | B1 | 11/2003 | Arias |
| 6,659,259 | B2 | 12/2003 | Knox et al. |
| 6,745,022 | B2 | 6/2004 | Knox |
| 6,918,537 | B2 | 7/2005 | Graves et al. |
| 7,083,084 | B2 | 8/2006 | Graves et al. |
| 7,093,761 | B2 | 8/2006 | Smith et al. |
| 7,168,615 | B2 | 1/2007 | Smith |
| 7,249,054 | B2 | 7/2007 | Keil |
| 7,292,998 | B2 | 11/2007 | Graves et al. |
| 7,293,704 | B2 | 11/2007 | Smith |
| 7,311,249 | B2 | 12/2007 | Smith et al. |
| 7,328,190 | B2 | 2/2008 | Smith et al. |
| 7,333,955 | B2 | 2/2008 | Graves et al. |
| 2003/0061113 | A1 | 3/2003 | Petrovich et al. |

\* cited by examiner

INTELLIGENT TRANSACTION ROUTER AND PROCESS FOR HANDLING MULTI-PRODUCT POINT OF SALE TRANSACTIONS

RELATED APPLICATION

This application claims the benefit of U.S. Provisional Application 60/497,454, filed Aug. 22, 2003. The disclosure of U.S. Provisional Application 60/497,454 is incorporated herein by reference

FIELD OF THE INVENTION

The present invention relates to an intelligent transaction router and a process for handling multi-product point of sale transactions. More particularly, the present invention relates to a transaction coupled to a standard card reader and process for handling point of sale activation of stored-value type cards.

BACKGROUND OF THE INVENTION

The stored-value card industry is growing rapidly. Gift cards alone generated revenues of $38 billion in 2002 (forecast to double by 2006: Bain & Co.). Likewise, prepaid cellular telephony is forecast to generate $9.9 billion of revenue in 2003, and $14.3 billion by 2005 (Frost and Sullivan). Prepaid phone cards and prepaid debit cards are experiencing similarly high growth. Nevertheless, gift cards are not currently made available conveniently to consumers. A Lord & Taylor gift card, for example, must be purchased at a Lord & Taylor outlet, instead of at the corner gas mart or drug store. In spite of this, gift card sales continue to rise at a rapid pace. For example, magnetic-stripe gift cards are rapidly gaining widespread acceptance with American consumers and retailers alike. A national study commissioned by ValueLink found that 40% of all American consumers purchased or received a gift card in the past 12 months. Consumers purchased an increasing amount of cards during the past year—an average of 4.6 cards per person in 2002, compared with 4.1 cards in 2001. Just as important, the average value of a card purchased grew to $51, from $44 the previous year.

New York-based Bain & Co., accurately predicted gift card sales would reach nearly $38 billion in 2002, up nearly threefold, from around $13 billion in 1998. This revenue is currently derived entirely from cards sold in the stores where they will be redeemed.

An equally positive trend is evident with prepaid debit cards. Credit/debit-card payment is obligatory in an increasing number of transactions. An unfulfilled need exists in the marketplace: 'unbanked' or credit-challenged consumers require a suitable financial instrument to shop online, make hotel or rental car reservations, book airline tickets, etc.

Interestingly, immigrants have discovered another use for prepaid debit instruments: money transfers. With two debit cards tied to a single account, an individual in the U.S. can load balance onto one card, while a relative abroad withdraws money from an ATM using the other card. This is beneficial to consumers because it bypasses expensive wire transfer fees.

In a similar way, prepaid calling cards have become necessities in the large ethnic and immigrant communities across the country. Large IXC carriers (i.e. ATT, Verizon, Sprint, etc.) sell their fixed, excess capacity to calling card companies at low rates. These companies are therefore able to sell consumers airtime in the form of prepaid cards that are substantially less expensive than traditional postpaid long distance. It is for this reason that immigrant populations have traditionally been the largest consumers in the prepaid calling card industry. They require the cheapest possible international rates for frequent calls to their countries of origin.

A similar growth pattern is evident with wireless service. Instead of being billed at the end of the month, consumers with prepaid wireless accounts use replenishment cards to recharge their phones. Prepaid wireless was initially aimed at consumers who did not qualify for postpaid service. In the last three years however, a shift has occurred in the marketplace: many consumers are intentionally selecting prepaid service for budgetary reasons. While 'unbanked', credit-challenged consumers use prepaid wireless service out of necessity, business travelers, parents of teens, and other budget conscious market segments increasingly prefer it.

The stored-value card industry is currently undergoing another radical transformation. Phone card distributors and retailers that previously stocked only 'live', 'scratch-off' cards have recently begun to install magnetic-stripe POSA (Point-of-Sale-Activation) systems. Unlike 'live' cards, which can be used after they are stolen, POSA cards are inactive and value-less until swiped by a store clerk through a counter-top card reader. Nothing is lost if the cards are stolen prior to activation. More importantly, retailers and distributors only pay for cards when they are activated, eliminating up-front inventory costs.

The foregoing mentioned developments have been a result of a number of factors, such as technological advances, changes in business models, advances in the utilization of the Internet, advances in security, among other reasons. A small representation of various technological advances and business models are disclosed in the following U.S. patents and published application: U.S. Pat. Nos. 6,651,885; 6,070,147; 6,129,276; 6,311,165; 6,256,690; 5,999,624; 5,696,908; 5,309,506; and U.S. Pub. No. 2003/0061113.

Notwithstanding such developments, for retail stores and other establishments to fully take advantage of the rapidly growing interest and benefits of POSA cards, a POSA system that is capable of activating a POSA card must be purchased or leased, and then utilized to activate POSA cards. Clerks and cashiers also must be trained to use these devices. Such financial and time investments in currently available POSA systems generally are not welcome by retailers, distributors and card issuers. The extra countertop space required to accommodate a dedicated POSA system also is generally undesired.

OBJECTS AND SUMMARY OF THE INVENTION

In view of the foregoing, it is an object of the invention to enable the efficient activation and sale of POSA cards, without the need for dedicated POSA systems.

It is a further object of the invention to enable the efficient activation and sale of a multitude of types of POSA cards, including gift, debit cards, telephone cards, and cellular replenishment cards, without the need for costly, specialized or dedicated POSA systems.

It is a further object of the invention to enable retailers to utilize their existing credit/debit card reader equipment to carry-out point-of-sale activation of POSA cards.

It is an additional object of the invention to enable retailers to activate POSA cards without the need for utilizing countertop equipment at those retailers.

In accordance with one embodiment of the present invention, a router is provided to be used to enable the point-of-sale activation of a point-of-sale activation type (POSA) device, and includes a first communication port for communicating with a payment device reader, such as a credit/debit card swipe terminal, and a second communication port for communicating with a processing entities that is capable of processing a financial transaction and a processing entity capable of activating a POSA device. The router also includes a control system adapted to either allow a communication initiated by the reader to pass through to a processing entity capable of carrying out the financial transaction (e.g., commence the credit card transaction), or to block the communication. If the payment device is identified as a non-point-of-sale activated (non-POSA) device, then communication is allowed to pass to the processing entity that carries out the financial transaction. If the payment device is identified as a POSA device, then the communication is blocked. In such case, the router establishes communication to a second processing entity capable of activating a POSA device and then transmits the POSA device's identification data, as supplied by the reader, to the second processing entity to enable the second processing entity to activate the POSA device.

As an aspect of the present invention, the router supplies to the reader a command code that instructs the reader to supply to the router the identification data of the payment device.

As another aspect of the present invention, the router, after the identification data is received, supplies to the reader a transaction rejection code that causes the reader to terminate the commenced financial transaction.

As a feature of this aspect, the supplied transaction rejection code also causes the reader to discontinue its communication (i.e., the call) with the router.

As a further aspect of the present invention, the router receives from the reader a monetary value to be placed on the POSA device, and the router supplies the designated monetary value to the second processing entity so that the POSA device is activated and set to the designated monetary value.

As yet another aspect of the present invention, the router includes an access button to identify that the payment device is a POSA device. Then, the call initiated by the reader is blocked by the router if the access button is depressed.

As yet a further aspect of the present invention, the router monitors the communication from the reader to identify whether the payment device is a POSA device or a non-POSA device.

As an additional aspect of the present invention, the router has a learn mode during which it learns a format of communication between the reader and the processing entity that processes credit and debit card financial transactions. The router then extracts the payment device's identification data from the reader communication in accordance with the learned format. The router may also learn proper transaction rejection codes during the learn mode.

As a feature of this aspect, the learn mode may be carried out by utilizing a learn payment device (e.g., a "Learn" card) that has known, pre-set identification data stored thereon. The learn payment device is read by the reader and a standard credit card transaction is carried out. The router, during this time, monitors the communications between the reader and the processing entity called by the reader. Then, the format of the communications is ascertained based on the known, pre-set identification data of the learn payment device and the monitored communications.

In accordance with another embodiment of the present invention, a combination of devices includes a payment device reader (e.g., credit card swipe terminal) in communication with the above-mentioned router. The router receives each communication initiated by the reader and either allows the router to be by-passed to allow the financial transaction to be processed in the manner intended by the reader or to be routed to a point-of-sale activation processing entity so that the POSA device, read by the reader, can be activated by the POSA processing entity.

As an aspect of the present invention, a printer is coupled to the router, and upon activation of a POSA device the printer is controlled to print a report that contains an authorization code that must be used in order to utilize the just activated POSA device.

As another aspect of the present invention, the router routes the communication initiated by the reader to the POSA processing entity when an already activated POSA device is to be increased in monetary value.

In accordance with a further embodiment of the present invention, a process for activating a POSA device is carried out by obtaining a POSA device, obtaining the POSA device's identification data by a reader, commencing by the reader a financial transaction by initiating a communication with a financial transaction processing entity, routing the communication to a POSA processing entity and communicating the POSA device's identification data to the POSA processing entity to enable its activation.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, in which.

DETAILED DESCRIPTION OF THE INVENTION

In general, the present invention enables for the easy and convenient activation and sale of point-of-sale activated cards (POSA cards) at retail establishments and other locations, without the need for such retail establishments to purchase (or lease) and utilize dedicated countertop processing equipment normally utilized to activate POSA cards. The present invention further enables retailers and other establishments to activate and sell a large variety of types of POSA cards with minimal expense and equipment. For example, a corner convenience store, by employing the present invention, will be able to activate and sell a multitude of gift cards for use in other stores, and activate and sell a multitude of pre-paid debit cards, pre-paid telephone cards, cellular replenishment cards, and other types of point-of-sale activated cards without using expensive, dedicated POSA systems.

Figure 1:
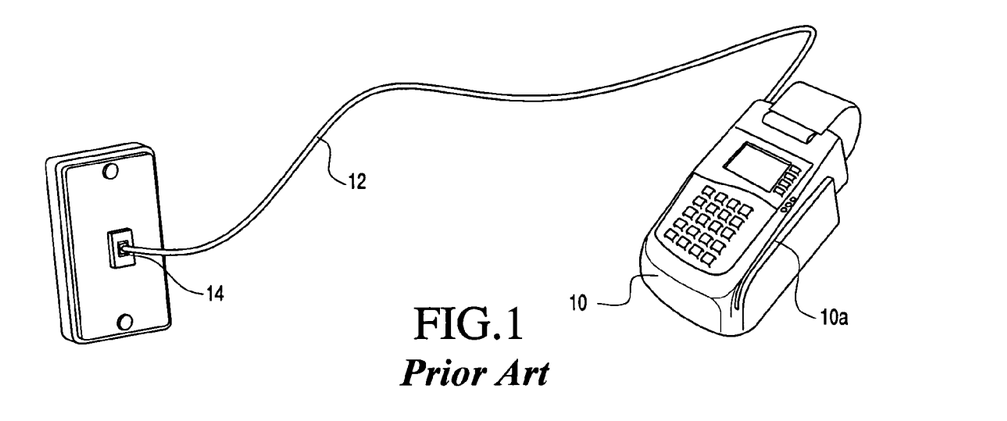
FIG. 1 shows a prior art credit card swipe terminal connected via a standard telephone line to a typical telephone wall jack.

Referring now to the drawings, FIG. 1 thereof shows a prior art arrangement of a typical credit card swipe terminal 10 (also called "credit card reader 10") connected via a standard telephone line 12 to a typical telephone wall jack 14. The operation of swipe terminal 10 is well known, and is utilized to enable consumer transactions utilizing credit and debit cards. The credit card swipe terminal (or card reader or device reader), as discussed herein is well known and generally is not capable of carrying out point-of-sale activation type processes.

Figure 2:
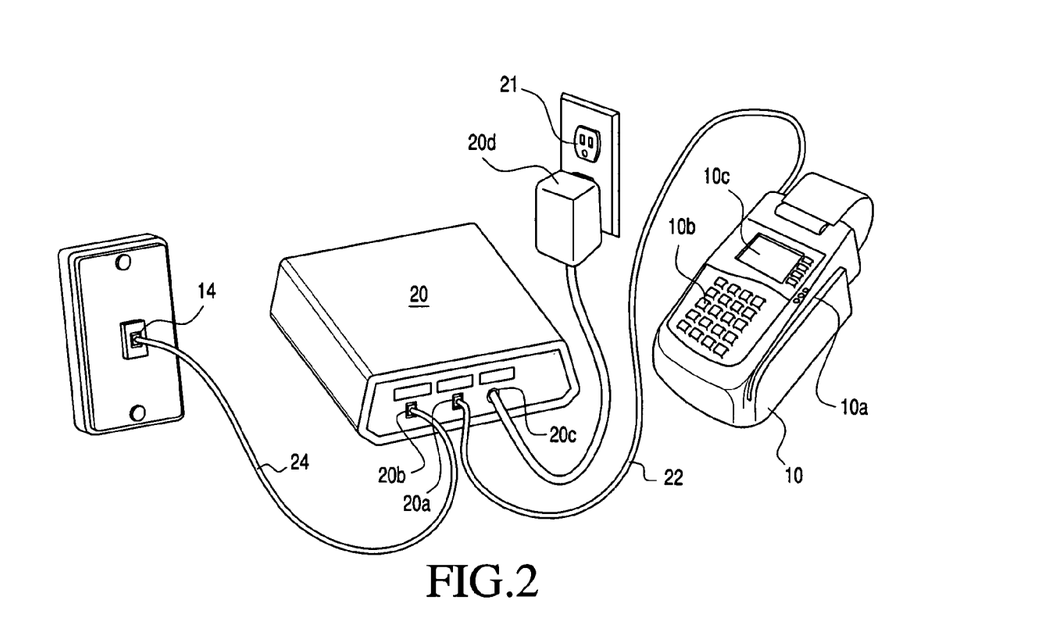
FIG. 2 shows an arrangement of devices employing the transaction router of the present invention.

In accordance with the present invention, and referring particularly to FIG. 2, a novel intelligent transaction router 20 (also called "transaction router" or "router") is disposed between existing credit card reader 10 and the public switched telephone network. A standard telephone line 22 is coupled between credit card reader 10 and a telephone port 20a (communication port) of transaction router 20, and a second telephone line 24 is coupled between telephone port 20b (communication port) of transaction router 20 and telephone wall jack 14. Power is supplied to transaction router 20 at a terminal 20c via a power supply plug 20d that is plugged into a standard power wall outlet 21. Of course, the router may be powered by battery.

During operation of the transaction router of the present invention, transaction router 20 monitors outgoing data telephone calls initiated by credit card reader 10 to determine if a POSA card (that is particularly utilized with the present invention) has been swiped by a merchant through the card reader's swipe terminal 10a. Upon detection of a POSA card, transaction router 20 redirects the data transaction phone call away from the called credit card processing server to a POSA network programmed to process activation in accordance with the present invention, as further described below. Redirection occurs in a manner transparent to credit card reader 10. Subsequent processing and activation of the just swiped POSA card is also discussed below. If, however, the just swiped card is assessed to be a typical charge card or debit card, then transaction router 20 routes the call (or simply allows the call to pass) to telephone wall jack 14 as if the transaction router didn't exist. In such case, the telephone call being made by card reader 10 to the called credit card processing server is carried out and the transaction is processed. In such case, the credit card (or debit card) transaction is carried out without any disruption by transaction router 20.

In accordance with one particular embodiment of the present invention, and with reference to FIG. 3, transaction router 30 shown functions in the same manner as transaction router 20, as mentioned above, but includes the following particular features and functions as follows. Transaction router 30 includes an access button 32 that functions to activate the transaction router. That is, transaction router 30 normally operates as a pass-through device and does not interfere with the request being dialed out by card reader 10 (or other equipment used to process a credit or debit card transaction). Thus, normal credit and debit card transactions occur as if transaction router 30 was non-existent at the retailer (or other establishment). Furthermore, transaction router 30 does not interfere with voice calls or with incoming calls to the card reader. However, and in accordance with the present invention, access button 32 on transaction router 30 is depressed to implement the below-described process of activating and selling a point-of-sale activation card (POSA card).

Figure 4:
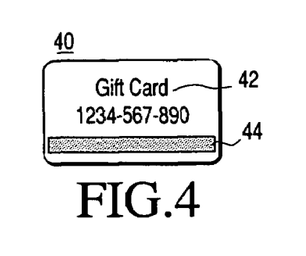
FIG. 4 is an exemplary gift card that may be utilized with the present invention.

Generally, and in accordance with the present invention, one or more types of POSA cards may be displayed within a retail establishment (or other location). One type of POSA card may be, as further discussed below, a Lord & Taylor gift card (as an example). Such POSA card may include indicia and design to identify the POSA card as a Lord & Taylor gift card. For example, FIG. 4 shows an exemplary gift card 40 containing indicia 42 and a magnetic stripe 44. For convenience in describing the invention, reference to gift card may generally refer to POSA cards that are either gift cards or other types of point-of-sale activated prepaid cards, such as debit cards, telephone cards and cellular replenishment cards. The various exemplary POSA cards that may be utilized by the present invention are further described below.

Returning to the display of a gift card (e.g., a Lord & Taylor POSA gift card, a Macy's gift card, etc.) in the retail establishment, and in accordance with the present invention, a consumer (or other individual) seeking to purchase the gift card picks-up the gift card and presents the gift card to the checkout clerk. At this time, the gift card (and the other gift cards displayed) has no value associated with it. The clerk requests the dollar amount (monetary value) to be placed on the card and the consumer identifies the amount. The consumer then pays the clerk the amount of money to be placed on the gift card. The consumer can pay the clerk in any manner accepted by the retail establishment. Of course, cash ordinarily is accepted. If payment is to be made by credit or debit card (or other known manner), then the transaction is carried out in the typical manner, as if the consumer was purchasing another product from the establishment. In the case of a credit or debit card, the credit or debit card is obtained from the consumer and the transaction is processed utilizing card reader 10 in the well known manner. Namely, the credit or debit card (also referred to simply as a payment card) is swiped through swipe terminal 10a of card reader 10, and the clerk enters on keypad 10b the identified amount to be placed on the gift card in order to identify the amount to be credited to the credit card or debited from the debit card. Thereafter, card reader 10 commences a telephone call to a credit card (and debit card) processing server 54 (also referred generally as a payment card processing entity, credit card processing entity or the like). Since transaction router 30 is operating as a pass-through device at this moment, the telephone call to credit card processing server 54 is made (via the public switched telephone network—PSTN 52). The financial transaction is handled in the ordinary manner and, assuming the transaction is successful, the call is terminated and card reader 10 displays on display 10c an authorization code. Then, the below-described process of activating the selected POSA gift card is commenced. It is noted that if cash is paid or payment is made by check (and accepted by the retailer), then the clerk may immediately perform the below-described process.

To initiate activation of the gift card in accordance with the present invention, the clerk (knowing the presented card to be a POSA card) depresses access button 32 on transaction 30 and then swipes the presented gift card through swipe terminal 10a of card reader 10 and enters the designated amount on the card reader's keypad 10b. Since the swipe and the dollar amount (and optionally, cents) entry are typical (and expected) of a transaction handled by the card reader, the card reader operates in its usual manner. In particular, the card reader allows the connected telephone line 22 to go off-hook and then proceeds to dial the credit card processing server in order to process the transaction. However, as of the moment of depressing the transaction router's access button 32, the transaction router is prompted to wait for a telephone off-hook condition and, upon detection of the off-hook condition, re-directs the call to the above-mentioned POSA network 56 (also generally referred to as a processing entity capable of activating POSA cards and other POSA devices). The POSA network then performs authentication and activation, as further discussed below.

However, if an off-hook condition on line 22 is not detected by transaction router 30 within a preset time period, for example, 15 seconds, then the transaction router returns to its pass-through mode. This takes into account accidental depressing of access button 32. In addition, if the clerk has either mistakenly depressed access button 32 or the consumer decides to terminate the transaction, or the transaction is discontinued for any other reason, the clerk may depress access button 32 again (during the preset time period) to cause transaction router 30 to return back to its pass-through mode.

After detection of the off-hook condition and re-direction of the call to POSA network 56 by transaction router 30, as mentioned above, the POSA network processes the activation request by first performing various authentication routines and then activates the gift card by informing the issuer of the gift card of the necessary information in order to activate it (further described below). An appropriate activation confirm message is then returned to transaction router 30.

In one variation of the present invention, an authorization code is transmitted from POSA network 56 through transaction router 30 to card reader 10, which displays the authorization code on display 10c in a manner similar to a credit card authorization. The authorization code provided then operates to confirm that the card has been activated. In another variation, the POSA network supplies a response (i.e., activation acknowledged) to transaction router 30 that is then printed out by an attached printer 50. Here, transaction router 30 may disconnect the connection with card reader 10 early (i.e., before confirmation of activation) since card reader 10 is no longer needed in the activation process. In a preferred embodiment, however, and while the activation request between transaction router 30 and POSA network 56 is proceeding, an appropriate rejection response (transaction rejection code) is transmitted to card reader 10 in order to cause card reader 10 to discontinue communication. Since various known card readers continue to re-dial if the telephone connection is prematurely terminated, transmission of an appropriate rejection code (e.g., credit card rejected) to card reader 10 effectively prevents further operation of (e.g., dialing by) the card reader. Meanwhile, independent of whether card reader 10 terminates its operation, the POSA network communicates with transaction router 30 to indicate that the gift card has been activated for the designated amount of money. Additional details of point-of-sale activation, as well as POSA card authentication, are further described below.

As would be appreciated from the description herein, if a credit or debit card is used to make payment for the gift card, then the clerk utilizes the card reader twice, the first time swiping the consumer's credit or debit card, the second time swiping the about-to-be purchased gift card. After both swipes, the same number is entered on the card reader's keypad. The number entered on the keypad after both swipes is the same. It is therefore seen that the steps to be taken by a clerk to implement the present invention are extraordinarily easy to learn.

Turning back to printer 50 mentioned above in one variation and shown in FIG. 3, printer 50 is controlled via a cable 28 to printout a confirmation report to indicate that the card is activated. The report may contain various information, such as the retailer name, location, the amount of the pre-paid (now activated) gift card, fees (if any) and other appropriate information. In addition to printing the confirmation report, printer 50 may be the normal printer utilized by card reader 10. That is, printer 50 may be of the type that is utilized with card reader 50 alone (in prior art scenarios). Then, with the present invention, printer 50 is not connected directly to card reader 10, but rather is connected via cable 28 to transaction router 30 and, in such case, the print output port of card reader 10 (that is connected to printer 50 in the absence of transaction router 30) is coupled via a cable 26 to an appropriate print-in port of transaction router 30. In this embodiment, and in most instances, print control data output from card reader 10 is transmitted via transaction router 30 to printer 50. Hence, printer 50 is utilized by card reader 50 in its normal manner during typical credit and debit charge transactions. Also, if card reader 10 is capable of providing printed reports of transactions, daily reports, etc., transaction router 30 of the present invention does not impede those printouts.

As mentioned above, point of sale activated (POSA) cards that may be utilized with the present invention include at least gift cards, prepaid calling cards, prepaid debit cards, and wireless replenishment cards.

Gift Cards: Gift cards are the latest incarnation of gift certificates: retailer-specific instruments that act as cash. While the gift certificate concept is not new, plastic magnetic-stripe gift cards have largely replaced cumbersome paper gift certificates. To use a gift card in accordance with the present invention, a gift-giving consumer would first select a major brand card from a display in the store of a retailer. After payment, the gift card would be activated through a terminal by the store clerk in accordance with the present invention. At that point, the consumer could immediately use the gift card in the issuing retailer's store (e.g., Macy's). More likely, however, the consumer would give the card as a gift, and some weeks later the gift card recipient would spend the balance of the gift card in the issuing retailer's store.

Prepaid Calling Cards: Calling cards are currently one the most mature forms of prepaid stored-value cards. Providers of calling cards purchase surplus airtime from large carriers at a discount. The access numbers on the backs of cards point calls to a provider's switching equipment, where calls are routed inexpensively. Major-brand calling cards, and non-major brands as well, can be activated and sold utilizing the herein described devices and processes. Like gift cards, these cards are activated at the register by a store clerk and are immediately useable.

Prepaid Debit Cards: These are MasterCard, Visa or private-label debit instruments, whose balance can be loaded and recharged at the point of issuance. Once loaded, prepaid debit cards can be used to make purchases or to make ATM withdrawals—transactions which generate residual fees. Any card carrying the MasterCard or Visa logo will be accepted at hundreds of thousands of locations globally—in short, anywhere Visa or MasterCard is accepted. Such prepaid debit cards can be activated and sold in the manner herein described. Monetary value can also be added to already activated cards, as further described below.

Wireless Replenishment Cards: Consumers with prepaid wireless accounts generally do not receive a bill at the end of each month, but rather pay for minutes in advance by purchasing airtime in the form of replenishment cards. In accordance with the present invention, after purchase and activation of a wireless replenishment card, the printed receipt (e.g., printed by printer 50—FIG. 3) contains a pin number to enable the consumer to use the card. Thereafter, the consumer calls a toll-free number displayed on the card and enters the previously supplied pin number. Wireless replenishment cards can be activated and sold in the manner herein described, and can be replenished in the manner described below.

The present invention may similarly be applied and utilized with the following product categories that also currently exist in the prepaid marketplace: home dial tone; roadside assistance; wireless text messaging; voice mail; satellite television; hotel; Internet (dial up and broadband); car rental; wireless video games, ring tones, and phone features; and bill payment. Still further, the present invention may be applied to other prepaid categories that are not generally available, and which include: pay-per-view; insurance; prepaid medical/dental services or discounts; and cable television.

Other Products: Other products can also be utilized, that is, activated, sold and, if appropriate, replenished in accordance with the present invention. Even as the prepaid marketplace evolves, the devices and processes of the present invention will still be able to allow for easy, quick and efficient dissemination, activation, replenishment and use of the prepaid cards, and other prepaid devices (e.g., prepaid smart cards, prepaid key tags, etc.). Moreover, as card readers evolve with the cards, the herein-described transaction router and associated processes can still be utilized. In such case, the card themselves, data formats and communication methods may change, but the inventive concepts and processes herein-described still may be employed. Thus, for purposes herein, the term "card" is intended to include cards as well as other types of devices.

Turning back to additional details of the present invention, the inventive process involves various entities. A card issuer issues a POSA card. For instance, Macy's is the card issuer of a Macy gift card. A retailer is a site where POSA cards are being sold and activated, and where the inventive transaction router is located. The retailer transmits card activation requests to the POSA network and receives either an approval or a rejection. A distributor is an entity that delivers cards to the retailers. Distributors may have sub-distributors. An automated clearing house is responsible for the debit/deposit of financial transactions. The POSA Network 56 is the entity that services the activation requests. The POSA network generally will receive card inventory data from the card issuer and transmits to the card issuer information regarding card activation. Various other entities may be involved.

During the inventive process herein described, card activation requests are generated at the retailer for a consumer-specified amount and sent to the POSA network for processing. Upon successful validation of the card by the POSA network, activation is granted for the requested amount. The POSA network notifies the particular issuer of the activated card and identifies the activated card and the amount of the activation. Other information may be conveyed, such as the identification of the retailer where activation occurred, the store address, the time of purchase, etc.

In addition to activating a non-activated POSA card, the present invention also enables a consumer (or other individual) to add monetary value to an already activated POSA card. In such case, the consumer can bring his/her previously received/purchased POSA card to any retailer that is capable of activating a POSA card in accordance with the present invention. The clerk may simply carry out the same steps as previously discussed to add value to the POSA card. Namely, the consumer initially pays the amount to be added to the card. If payment is by credit or debit card, the clerk processes the transaction in the usual manner. Thereafter, the clerk swipes the already activated POSA card through the card reader and enters the amount to be added to the card. Any of the herein-discussed variations may be employed. In this case, where money is added to a card (also called "reloading" or "replenishing"), the POSA network preferably communicates with the card issuer before concluding the process to allow the card issuer the opportunity to verify that the reloading transaction is accepted. One case in which reloading would likely be rejected is if reloading causes the card to have a value beyond the maximum allowed value of such card. Generally, the POSA network is not aware of the current value (before, or even after, reloading) of the card and thus communication with the card issuer prior to concluding the reloading transaction is desirable. Reloading of the card can be rejected for other reasons as well.

Two different scenarios of card issuer notification can be carried out. One scenario entails the POSA network informing the card issuer of the details after the POSA card is activated and sold to a consumer. The other scenario entails passing the activation request to the card issuer prior to activation, so as to provide the card issuer the opportunity to reject the request. In most instances, the card issuer will likely allow the request. However, the card issuer may be aware of information unavailable to the POSA network, so as to be able to better ascertain whether the request should be allowed or rejected. Notably, the above-mentioned reloading request is one case where this latter scenario is preferred, since it is unlikely that the POSA network would have access to the database maintaining the current value of the card. As mentioned above, the POSA network would likely not be able to determine whether reloading of a card would cause the card to have a value that exceeds the maximum allowable value. Other instances where it is desirable to allow the card issuer the opportunity to reject a transaction (activation or reloading) are possible.

Transaction router 30 of the present invention has been described as operating in two different modes, one in which the device operates as a pass-through device or, upon depressing access button 32, operates to route communication to POSA network 56 in order to activate a POSA card. In a preferred embodiment of the present invention, transaction router 30 has four operational modes or states: (1) Reset; (2) Setup; (3) Bypass; and (4) Route.

The Reset state is the factory default. An optional hardware reset button is depressed for, for example, three seconds. Upon reset, hardware is reset, and any learned data (discussed below) or other programmed information is reset.

The Setup state allows the transaction router to be initialized and programmed. During the setup state, the identification (e.g., serial number) of the particular transaction router and other information may be communicated to the POSA network. Correct communication between the transaction router and the POSA network may also be verified. Also, the below described Learn Mode process may be carried out, as further described below.

The Bypass state, as previously discussed, allows all signals and data to flow without disruption between the connected card reader and the called number. The transaction router also does not intercept or block incoming calls to the card reader and does not intercept or block voice calls.

The Route state, also previously discussed, redirects a call to the POSA network to conduct activation of a POSA card. The Route state is entered when the access button on the transaction router is depressed.

The Learn Mode, which is part of the Setup state, enables the transaction router to learn the reader-to-bank protocol for interpretation of reader-originated card transactions. For example, where the dollar amount (monetary value) shows up in the data stream. The Learn Mode is particularly advantageous when interfacing to various types of card readers, such as NURITs. With such types of devices, when a hang up is received by a NURIT before proper completion of the call, the NURIT will prompt the retailer to try the call again. If the retailer inadvertently activates the retry, the NURIT will attempt to dial out. The NURIT will detect no line (since the transaction router is using it to communicate with the POSA network), and wait. Once the line clears, it will re-dial, and pass the POSA Card transaction to the credit card authorization server. Thus, one benefit of the Learn Mode is that it prevents, or at least minimizes, the transmission of data on POSA cards to credit card authorization servers.

In accordance with the present invention, while in the inventive Learn Mode, a pre-supplied card (a "Learn card") is swiped through the attached card reader and the clerk enters in a pre-supplied monetary amount. The card reader goes off-hook and dials the credit card authorization server that is normally called during a credit card transaction. In the Learn Mode, the router allows the call to pass to the credit card authorization server. During the entire call, the transaction router captures all data sent from and to the card reader. As would be expected, the called server responds with a negative acknowledgement, principally since the Learn card is specifically encoded to elicit a failure (i.e., it is not a valid credit or debit card), and the telephone call is terminated.

In one variation of the present invention, the transaction router decodes the captured data to ascertain various information, such as the respective locations of the card data and entered monetary amount supplied by the card reader (with the help of the fact that the card data and the monetary amount are already known), and the denial information supplied to the card reader. This information and other pertinent data are stored within the transaction router's internal memory for later use. In another variation of the present invention, the transaction router dials the POSA network 56 and transfers the captured data to the POSA network which in turn decodes the data to extract the pertinent information. Such information is maintained by the POSA network or, alternatively, supplied to the transaction router for storage. In any case, the transaction router and/or the POSA network know how to decode the data supplied by the card reader and, further, how to return a denial to the card reader (during the activation process) sufficient to cause the card reader to discontinue processing and to discontinue the call commenced by the card reader. A Second learn card may be employed to test the system, if necessary. Moreover, since the Learn Mode of the invention only causes the bank to receive and process information from an invalid card, any intrusion and disruption that is realized by the process occurring during the Learn Mode is, at most, minimal.

After initial setups, as discussed above, the transaction router's default state is the Bypass state. In the Bypass state, the transaction router acts as a pass through device, and allows all dialed calls (in either direction) to go through, untouched. In the preferred embodiment, the transaction router also acts as a pass through device when no power is present.

When the retailer presses the access button, the transaction router starts a timer (e.g., 15 second timer) and optionally flashes an LED to externally identify that the transaction router is in the Route state. As previously discussed, the transaction router waits for an off-hook and dial from the card reader. If no card swipe is received within the preset timer limit, the transaction router turns off the LED and returns to its default Bypass state (also called pass through mode). While in the Route state, if the access button is pressed again, the transaction router turns off the LED and returns to the Bypass state. If an off-hook and dial string is detected, the transaction router redirects the call to the POSA network.

In one version of the present invention, the transaction router, prior to communicating with the POSA network, issues an appropriate inquiry command to the card reader to cause the card reader to transmit a data string corresponding to the card data of the just-swiped POSA card. Thereafter, the transaction router transmits the card data to the POSA network. Alternatively, the card reader establishes communication with the POSA network shortly after the card reader initiates the call, and the POSA network transmits the necessary command to the card reader, via the transaction router, to cause the card reader to supply the card data. In either instance, the POSA network verifies authentication of the POSA card and, if authenticated, activates the card. Preferably, various additional authentications are carried out by either the transaction router or the POSA network, such as a checksum on the transmitted data strings. Moreover, various card readers may require receipt of various acknowledgements before transmitting card identification data. Carrying out of the processes in the above-mentioned Learn Mode enables either the transaction router or the POSA network to "learn" the necessary steps and commands to successfully enable the card reader to transmit the required information.

In the case where the transaction router receives from the card reader the card data (of the POSA card to be activated) without assistance from the POSA network, the transaction router initiates communication with the POSA network either while collecting the card data or after doing so. The transaction router may employ a second modem in such case. Thereafter, communications between the transaction router and the POSA network entail various authentications, such as checksum. Finally, the POSA network transmits an activation acknowledgement to the transaction router to confirm activation is complete.

As mentioned above, one variation of the invention entails the transaction router communicating with the attached card reader to obtain the card data, without assistance or communication with the POSA network. In this case, the transaction router had stored within its memory the necessary command strings and communications to enable transmission of the card data by the card reader (e.g., such command strings/communications as learned during the above-discussed Learn Mode). The transaction router then communicates with the POSA network to conduct authentication and then activation of the card. In practice, it is possible that communication between the transaction router and the card reader will be complete before the card data is supplied from the transaction router to the POSA network. In such case, the line between the transaction router and the card reader will be disconnected (i.e., goes on-hook) in advance of completing activation of the card, but such disconnection from the card reader will have no impact of card activation, as would be appreciated. Moreover, from the standpoint of the POSA network, it does not matter whether or not the card reader, after it has sent the card data, successfully processes responses communicated to it, although it is generally preferred that the card reader is prevented from re-dialing in an attempt to again process the transaction. On the other hand, if the card data cannot be authenticated or verified, then it is preferred to send an appropriate request to the card reader to cause it to resend the card data or, alternatively, hang up and re-dial to re-attempt processing of the card. In the case when the call initiated from the card reader to the transaction router has already been disconnected, and thereafter the card data cannot be authenticated, then a printer attached to the transaction router preferably will provide a printout that the retailer should swipe the card through the card reader again.

Upon successful activation of the card, an appropriate message to the retailer, such as by printout, is provided informing the retailer of the successful activation of the card with the indicated amount of money. Communication between the POSA network and the transaction router is terminated.

An exemplary message protocol for messages that flow between the transaction router and the POSA network is for the transaction router to first transmit a pre-transaction message that contains the transaction router serial number, which uniquely identifies the retailer, and preferably revision information, which is used to determine how to process the pre-transaction message. During communication, the POSA network responds to each message with an ACK/NAK (acknowledged/not acknowledged), after performing various checksum calculations. With each communication, the POSA network transmits an instruction to the transaction router, such as to hang-up on the card reader, print a message, etc. Card data is transmitted to the POSA network and various authentications are performed. Activation is verified and appropriate control information is transmitted to the transaction router. Of course, other protocols may be employed.

Upon completion of activation, an appropriate message is printed. Alternatively, a display screen or other communication means is provided to inform the retailer of activation of the card. Preferably, the transaction router stores all information pertaining to the last activation and, better yet, all activations and failed activations for the current day (or week, etc.). Daily or weekly reports optionally may be provided, for example, via printout, by the transaction router identifying activations and failed activations.

Multiple variations of the present invention are discussed above. In particular, communication to the card reader may be carried out solely by the transaction router (without assistance from the POSA network). Alternatively, communication to the card reader may be controlled by the POSA network, where the transaction router operates more as a conduit for the communication in this variation. Since the present invention is meant to be utilized with any type of credit/debit card reader currently available, as well as with future variations thereof, the features described herein pertaining to successfully communicating with a card reader are deemed to be pertinent. In one variation, the transaction router simulates the behavior of a credit/debit card processing server so as to be able to receive the card data from the card reader. The card data then is transmitted to the POSA network. In another variation, the POSA network simulates the behavior of the credit/debit card processing server also for the purpose of obtaining the card data. In either variation, it is necessary to "learn" how to communicate with the card reader to cause the card reader to supply the card data. The above-mentioned Learn Mode achieves this. In another variation, the retailer supplies the make and model of the card reader being utilized (and any other necessary information) prior to the retailer employing the transaction router, and the POSA network utilizes a look-up table or other method to ascertain the necessary string commands and communications needed to communicate with the particular card reader identified.

In the case where the transaction router operates more as a conduit for communication between the POSA network and the card reader, it is possible to require the retailer to swipe the card a second time through the card reader (perhaps several seconds after the first swipe) so as to allow time for the transaction router to call the POSA network (and also to allow verification by the POSA network of the transaction router's identity). Although this variation is generally not preferred (due to the inconvenience of having to swipe the POSA card through the card reader twice), an electronically simpler version of the transaction router generally may be employed in this variation, as compared to the other described variations.

In each of the above-described variations of the present invention, the transaction router employs an access button that, upon depression, causes the transaction router to route communication to a POSA network, which in turn enables activation of the swiped POSA card. In accordance with another variation of the present invention, the transaction router need not utilize such an access button to enter the Route state. Rather, the transaction router is designed to continuously inspect the data stream to determine if the just swiped card is a POSA type card and, if so, then communication is routed to the POSA network. Here, upon swiping the POSA card through the card reader, the card reader calls the usual credit/debit card processing server and begins processing the transaction. During this time, the transaction router monitors the data transmitted. After the card data is transmitted, the transaction router determines whether the card data represents a non-POSA type card (e.g., typical credit card, debit card, etc.) or a POSA type card employed with the present invention. In the former case, the transaction router leaves the call unaffected so that the transaction is processed without interruption. In the latter case, where the transaction router identifies the card as a POSA type card, the transaction router terminates the call and immediately contacts the POSA network to thereafter activate the POSA card. Interestingly, as would be appreciated, if the POSA type card is activated with a designated monetary value, the card becomes a non-POSA card so that a subsequent financial transaction using the already activated card can proceed accordingly.

In each of the previously discussed variations of the present invention, the transaction router generally utilizes two modems to enable the separate calls called for: one between the card reader and the transaction router; the other between the card reader and the POSA network. Well known components, such as ring detectors, off-hook detectors, line interfacers, micro-controllers and other components, may be utilized within the transaction router of the present invention. For purposes of convenience, these components collectively are referred to herein as the router's control system. Given the detailed description herein, since those of ordinary skill in the art would readily know how to design the herein-described transaction router, as well as the variations mentioned, a discussion of particular designs of the router or of the router's control system is not provided herein. Rather, the present invention is intended to cover various designs of a transaction router operating in the manner herein discussed.

The transaction router of the present invention, along with the associated process for activating POSA cards, includes various features, including non-interference of card reader transactions; short transaction time to activate POSA cards; print receipts (successful and failed transactions); print End Of Day reports; non-interference with card reader use of the printer interface; ability to terminate card reader requests; ability to share the existing card reader external printer; and ability to block the card reader output to printer as needed. The transaction router of the present invention provides a low cost alternative to expensive dedicated POSA systems by allowing the continued use of existing card retailers at retail establishments.

As a feature of the present invention, the transaction router may provide date of purchase, merchant name (or store number), store address; time of purchase; product type; denomination and other potentially useful information to the POSA network during or after activation. In turn, market data can be utilized and provided by the POSA network to the card issuers, such as demographic information, etc.

In addition to the foregoing, various benefits to card issuers include the ease of issuing gift cards, debit cards, phone cards, wireless replenishment cards and other point-of-sale activated cards without the need for the card issuers to employ large scale sale of such cards at their own retail establishments. Increased exposure to additional consumers often translates into increased sales. Thus, previously unexplored channels of distribution can be utilized with minimal intrusion and effort by such channels. Of course, the issued POSA cards further allows for increased "branding."

Distributors of pre-paid cards also benefit by utilizing more point-of-sale activated cards by employing the present invention. This in turn enables distributors to tie up less investment in POSA cards, which represent valueless, inactive inventory. Other benefits of offering POSA cards, rather than pre-paid non-POSA cards, are well known.

The benefit to retailers has been already discussed. A retailer need only implement the herein disclosed transaction router, rather than substantially more expensive POSA systems, and less countertop space is employed as compared to other POSA systems. Also, non-POSA cards do not have to be pre-purchased by retailers and theft of non-activated POSA cards has negligible impact on retailers, as well as on the card issuers, thus allowing retailers to freely display POSA cards for sale. Still further, training of clerks to activate a POSA card employing the present invention is, at most, minimal (i.e., teach someone to press a button and then swipe the POSA card through the card reader).

Consumers are enabled to use their credit cards to transfer sums of money onto a POSA card with a simple transaction.

Figure 3:
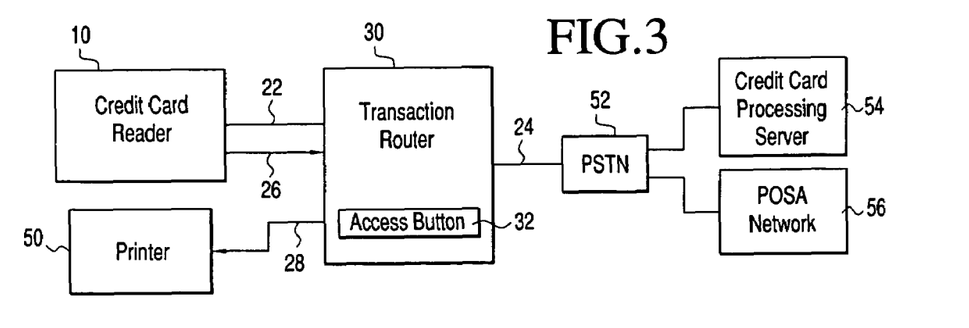
FIG. 3 is a block diagram of the various components and systems employed with the present invention.
Figure 5:
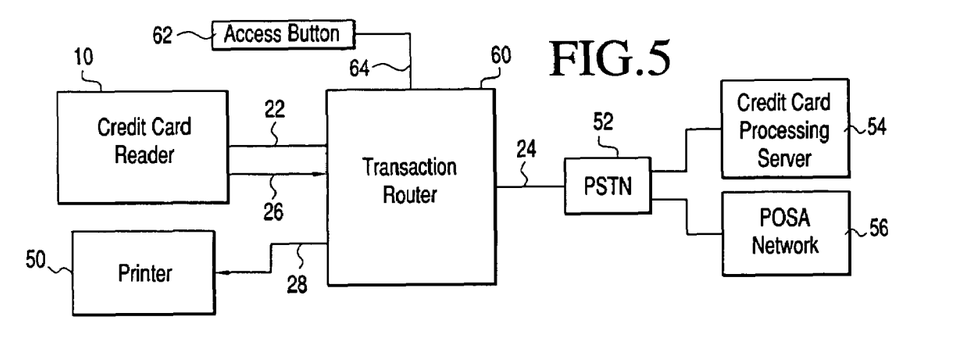
FIG. 5. is a block diagram of various component and systems in accordance with another embodiment of the present invention.
Figure 6:
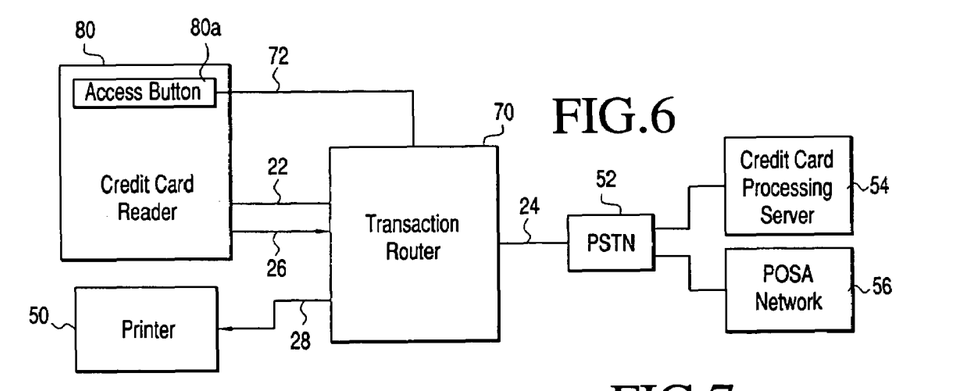
FIG. 6. is a block diagram of various component and systems in accordance with a further embodiment of the present invention.

Transaction router 30 contains an access button, as depicted in the embodiment shown in FIG. 3, that causes the transaction router to enter the Route state, as previously discussed. However, it is possible for this button to be disposed within a separate device. For example, FIGS. 5 and 6 disclose block diagrams of other arrangements in accordance with the present invention. In FIG. 5, transaction router 60 is substantially similar to transaction router 30 described above, but does not contain an access button. Rather, the access button 62 is a separate component that is coupled to transaction router 60 via a data line 64. In this variation, access button 62 may be placed in a location separate and apart from transaction router 60. For example, within a retail establishment, transaction router 60 may be hidden under the counter, and access button 62 placed on top of the counter for use by the clerk. In FIG. 6, the access button 80*a* is contained within a credit card reader 80, with transaction router of the present invention 70 receiving a data line 72 that indicates when the access button is depressed. The access button 80*a* may be an auxiliary button or the like that is contained in card readers. In this variation, no additional countertop equipment is needed to implement the present invention, other than the card reader.

Figure 7:
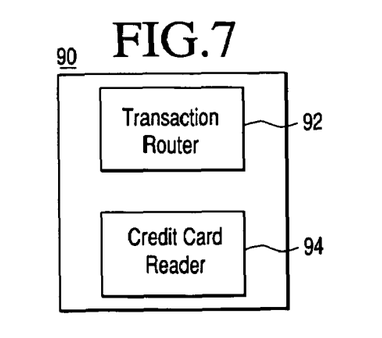
FIG. 7 is a schematic illustration of the transaction router of the present invention and a credit card reader disposed within a single housing.

FIG. 7 shows yet another variation of the invention wherein the inventive transaction router 92 and a card reader 94 are disposed within a single housing 90. The operation of such an integrated device is generally the same as previously discussed.

The invention has been described as employing telephone lines and the public switched telephone network to enable the various components and entities to communicate with one another. However, other modes of communication may be utilized. For example, the card reader and the transaction router may be hard-wired to one another, or may communicate wirelessly or through another manner. If wirelessly, as an example, the transaction router's communication ports would have wireless communication capability. The transaction router may be designed to communicate with one or more credit card processing servers and may communicate with one or more POSA networks or systems via cable, the Internet, satellite communication or other appropriate method. Also, the POSA network has been described herein to serve the role of enabling the activation of a POSA card used in accordance with the present invention. Of course, the POSA network may represent an intermediary system and/or may represent multiple devices and systems carrying out the described functions.

Moreover, the present invention has been described with reference to point-of-sale activation "cards." However, the present invention is not limited to typical "cards" (i.e., a piece of plastic with a magnetic stripe), and may employ and be utilized with other types of devices. For example, smart cards, key tags, RF devices, cards with bar codes or other machine-readable data, and other portable items containing machine-readable data may be utilized with the present invention. Similarly, the present invention has been described as obtaining card data using a credit card reader's swipe terminal. However, the present invention is not limited to reading data by swiping a card through a terminal, but covers obtaining data by other methods, such as by RF communication, optical scanning, magnetic reading, etc. In various cases, physical contact with the card or other item containing the data is not needed.

Still further, the present invention has been described with reference to the sale of a gift card, debit card, etc., at a retail establishment. However, other establishments not commonly associated with retail may be able to employ the present invention. For example, a large employer (or other organization) may disseminate cards having monetary value or "credits" or other "value" to employees (or members of the organization, or the general public, etc.) for various purposes. Such cards can be activated in accordance with the present invention immediately prior to dissemination.

Therefore, it is intended that the appended claims be interpreted as including the embodiments described herein, the alternatives mentioned above, and all equivalents thereto.

What is claimed is:

1. A process for activating a point-of-sale activation (POSA) device, comprising the steps of:
    obtaining a point-of-sale activation (POSA) device, the POSA device having identification data stored thereon or therein;
    obtaining by a reader the identification data of the obtained POSA device;
    commencing by the reader a financial transaction by initiating a communication to communicate with a first processing entity capable of processing financial transactions;
    routing, prior to when communication between the reader and the first processing entity is established, the communication to a second processing entity capable of activating the POSA device; and
    communicating the identification data to the second processing entity to cause the POSA device to be activated.

2. The process of claim 1, further comprising the step of communicating to the reader a rejection code encoded to indicate to the reader that the commenced financial transaction is rejected.

3. The process of claim 1, further comprising the step of communicating to the reader a communication to cause the reader to terminate its communication.

4. The process of claim 3, wherein the step of communicating to the reader a communication to cause the reader to terminate its communication is carried out prior to the step of communicating the identification data to the second processing entity.

5. The process of claim 1, wherein the step of routing is carried out by a router distinct from the reader.

6. The process of claim 5, wherein the step of communicating the identification data to the second processing entity is carried out by the router.

7. The process of claim 6, further comprising the step of terminating communication between the reader and the router prior to the step of communicating the identification data to the second processing entity.

8. The process of claim 1, further comprising the step of providing a payment instrument to pay for the POSA device.

9. The process of claim 8, wherein the payment instrument is a payment device having payment device identification data store thereon or therein; the process further comprising the steps of identifying a monetary value to be placed on the obtained POSA card; using the reader to commence a financial transaction pertaining to the payment card by initiating and achieving communication with the first processing entity; and providing the payment card data and the identified monetary value to the first processing entity to cause the commenced financial transaction for the identified monetary value to be carried out.

10. The process of claim 9, wherein the step of communicating the identification data to the second processing entity includes also communicating the identified monetary value to the second processing entity to cause the POSA device to be activated to the identified monetary value.

11. The process of claim 1, further comprising identifying a monetary value to be placed on the obtained POSA card; wherein the step of obtaining by a reader includes obtaining the identified monetary value; and the step of communicating the identification data to the second processing entity includes also communicating the obtained monetary value to the second processing entity to cause the POSA device to be activated to the identified monetary value.

12. The process of claim 1, further comprising the step of identifying that the obtained device is a POSA device; and wherein the routing step is carried out only if the obtained device is identified as a POSA device.

13. The process of claim 1, wherein the step of routing is carried out by a router distinct from the reader; the process further comprising manually depressing an access button disposed on the router; and wherein the routing step is carried out only if the access button is depressed within a preset time period prior to when communication with the first processing entity is initiated during the commencing step.

14. The process of claim 1, further comprising the step of learning a format of communication by the reader; and wherein the step of communicating the identification data to the second processing entity is carried out by transmitting a communication from the reader to the second processing entity and extracting the identification data of the POSA device from the transmitted communication in accordance with the learned format to cause the POSA device identified by the extracted identification data to be activated.

15. A process for activating a point-of-sale activation (POSA) device, comprising the steps of:
   obtaining a payment device, the payment device being one of a point-of-sale activated (POSA) device and a non-point-of-sale activated (non-POSA) device, the payment device having identification data stored thereon or therein;
   identifying the payment device as a POSA device or a non-POSA device; obtaining by a reader the identification data of the obtained payment device; commencing by the reader a financial transaction by initiating a communication to communicate with a first processing entity capable of processing financial transactions, the communication being supplied to a router distinct from the reader;
   allowing, by the router, the initiated communication to pass to the first processing entity if the payment device is identified as a non-POSA device;
   blocking, by the router, the initiated communication if the payment device is identified as a POSA device, and after blocking the initiated communication, carrying out the steps of receiving by the router the obtained identification data from the reader, and transmitting the obtained identification data from the router to a second processing entity to cause the second processing entity to activate the payment device as identified by the transmitted identification data.

16. The process of claim 15, wherein the step of receiving by the router the obtained identification data from the reader is carried out by communicating by the router to the reader a command code instructing the reader to supply the obtained identification data of the payment device and receiving the identification data by the router in response to the communicated command code.

17. The process of claim 16, wherein, after the identification data is received by the router, the router communicates to the reader a transaction rejection code sufficient to cause the reader to terminate the commenced financial transaction.

18. The process of claim 16, wherein, after the identification data is received by the router, the router communicates to the reader a control code to cause the reader to discontinue the communication initiated by the reader.

19. The process of claim 15, further comprising, if the payment device is a POSA device, the steps of identifying a monetary value to be placed on the POSA device and supplying the identified monetary value to the reader; and wherein, after the initiated communication by the reader is blocked by the router, the router also receives the supplied monetary value from the reader, and the supplied monetary value is also transmitted from the router to the second processing entity to cause activation of the POSA device to the transmitted monetary value.

20. The process of claim 15, further comprising, if the obtained payment device is a POSA device, the step of providing a payment instrument to pay for the obtained POSA device.

21. The process of claim 20, wherein the payment instrument is a credit or debit instrument having identification data store thereon or therein; and wherein the obtaining by a reader and commencing by the reader steps are carried out two times, one of the two times for the credit or debit instrument to pay for the POSA device, the other of the two times for the POSA device to activate the POSA device.

22. The process of claim 15, wherein the step of identifying the payment device as a POSA device or a non-POSA device is carried out by depressing a button on the router when the payment device is a POSA device and not depressing the button on the router when the payment device is a non-POSA device.

23. The process of claim 15, wherein the step of identifying the payment device as a POSA device or a non-POSA device is carried out by the router monitoring the communication initiated by the reader to commence the financial transaction.

24. The process of claim 15, further comprising the step of learning a format of communication between the reader and the first processing entity; and wherein the step of receiving by the router the obtained identification data from the reader is carried out by receiving by the router from the reader a communication containing the identification data, and extracting by the router the identification data from the received communication in accordance with the learned format.

25. The process of claim 24, further comprising the step of supplying by the router to the reader a transaction rejection code in accordance with the learned format to cause the reader to terminate the commenced financial transaction.

26. The process of claim 24, wherein the step of learning a format of communication between the reader and the first processing entity is carried out by:
   providing a learn payment device having known, pre-set identification data stored thereon or therein;
   obtaining by the reader the pre-set identification data of the learn payment device; carrying out the step of commencing by the reader a financial transaction
   carrying out the allowing step to allow the initiated communication to pass to the first processing entity;
   capturing by the router the communication between reader and the first processing entity; and
   ascertain the format of communication between the reader and the first processing entity based on the known, pre-set identification data of the learn payment device and the captured communication.

27. The process of claim 15, further comprising the step of printing a report containing an authorization code necessary to be utilized by a holder of the activated POSA device.

28. The process of claim 15, wherein the step of blocking is carried out when the payment device is an already activated POSA device having a value to be increased, and the step of transmitting the obtained identification data from the router to the second processing entity causes the second processing entity to increase the value of the already activated payment device.

* * * * *

UNITED STATES PATENT AND TRADEMARK OFFICE
CERTIFICATE OF CORRECTION

PATENT NO.       : 7,580,859 B2
APPLICATION NO.  : 10/923976
DATED            : August 25, 2009
INVENTOR(S)      : Theodore F. Economy et al.

It is certified that error appears in the above-identified patent and that said Letters Patent is hereby corrected as shown below:

In column 17 and 18, lines 56-67 and lines 1-16, delete
Claim "15. A process for activating a point-of-sale activation (POSA) device, comprising the steps of:
obtaining a payment device, the payment device being one of a point-of-sale activated (POSA) device and a non-point-of-sale activated (non-POSA) device, the payment device having identification data stored thereon or therein;
identifying the payment device as a POSA device or a non-POSA device;
obtaining by a reader the identification data of the obtained payment device;
commencing by the reader a financial transaction by initiating a communication to
communicate with a first processing entity capable of processing financial transactions, the communication being supplied to a router distinct from the reader;
allowing, by the router, the initiated communication to pass to the first processing entity if the payment device is identified as a non-POSA device;
blocking, by the router, the initiated communication if the payment device is identified as a POSA device, and after blocking the initiated communication, carrying out the steps of receiving by the router the obtained identification data from the reader, and transmitting the obtained identification data from the router to a second processing entity to cause the second processing entity to activate the payment device as identified by the transmitted identification data."

Lines 56-67 and Lines 1-16 and insert Claim -- 15. A process for activating a point-of-sale activation (POSA) device, comprising the steps of:
obtaining a payment device, the payment device being one of a point-of-sale activated (POSA) device and a non-point-of-sale activated (non-POSA) device, the payment device having identification data stored thereon or therein;
identifying the payment device as a POSA device or a non-POSA device;
obtaining by a reader the identification data of the obtained payment device;
commencing by the reader a financial transaction by initiating a communication to communicate with a first processing entity capable of processing financial transactions, the communication being supplied to a router distinct from the reader;
allowing, by the router, the initiated communication to pass to the first processing entity if the payment device is identified as a non-POSA device;
blocking, by the router, the initiated communication if the payment device is identified as a POSA device, and after blocking the initiated communication, carrying out the steps of receiving by the router the obtained identification data from the reader, and transmitting the obtained identification data from the router to a second processing entity to cause the second processing entity to activate the payment device as identified by the transmitted identification data. --, therefor.

UNITED STATES PATENT AND TRADEMARK OFFICE
CERTIFICATE OF CORRECTION

PATENT NO. : 7,580,859 B2
APPLICATION NO. : 10/923976
DATED : August 25, 2009
INVENTOR(S) : Theodore F. Economy et al.

It is certified that error appears in the above-identified patent and that said Letters Patent is hereby corrected as shown below:

In column 19, line 16, in claim 26, after "transaction" insert -- ; --.

Signed and Sealed this

Twenty-fourth Day of November, 2009

David J. Kappos
*Director of the United States Patent and Trademark Office*